UNITED STATES PATENT OFFICE.

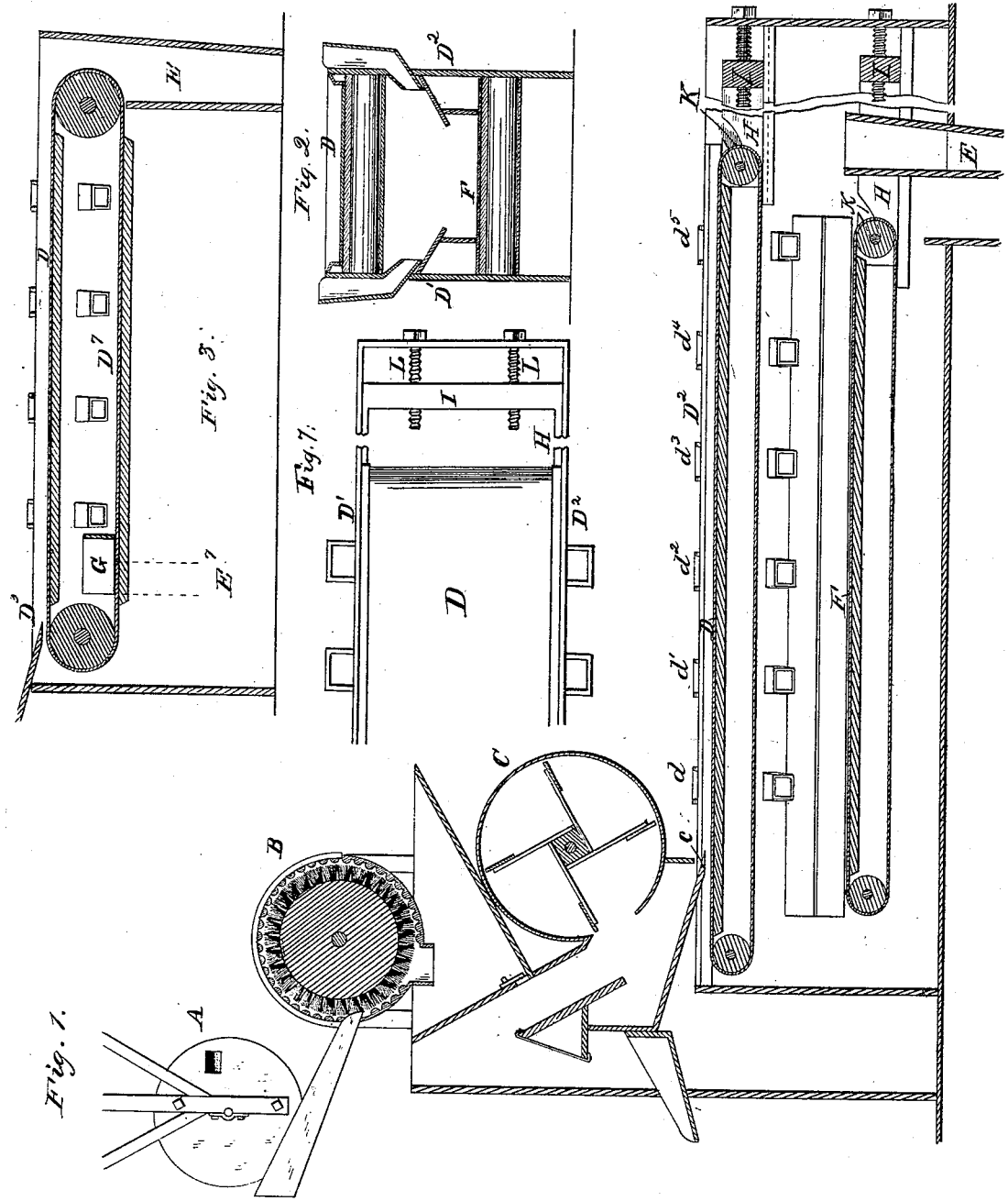

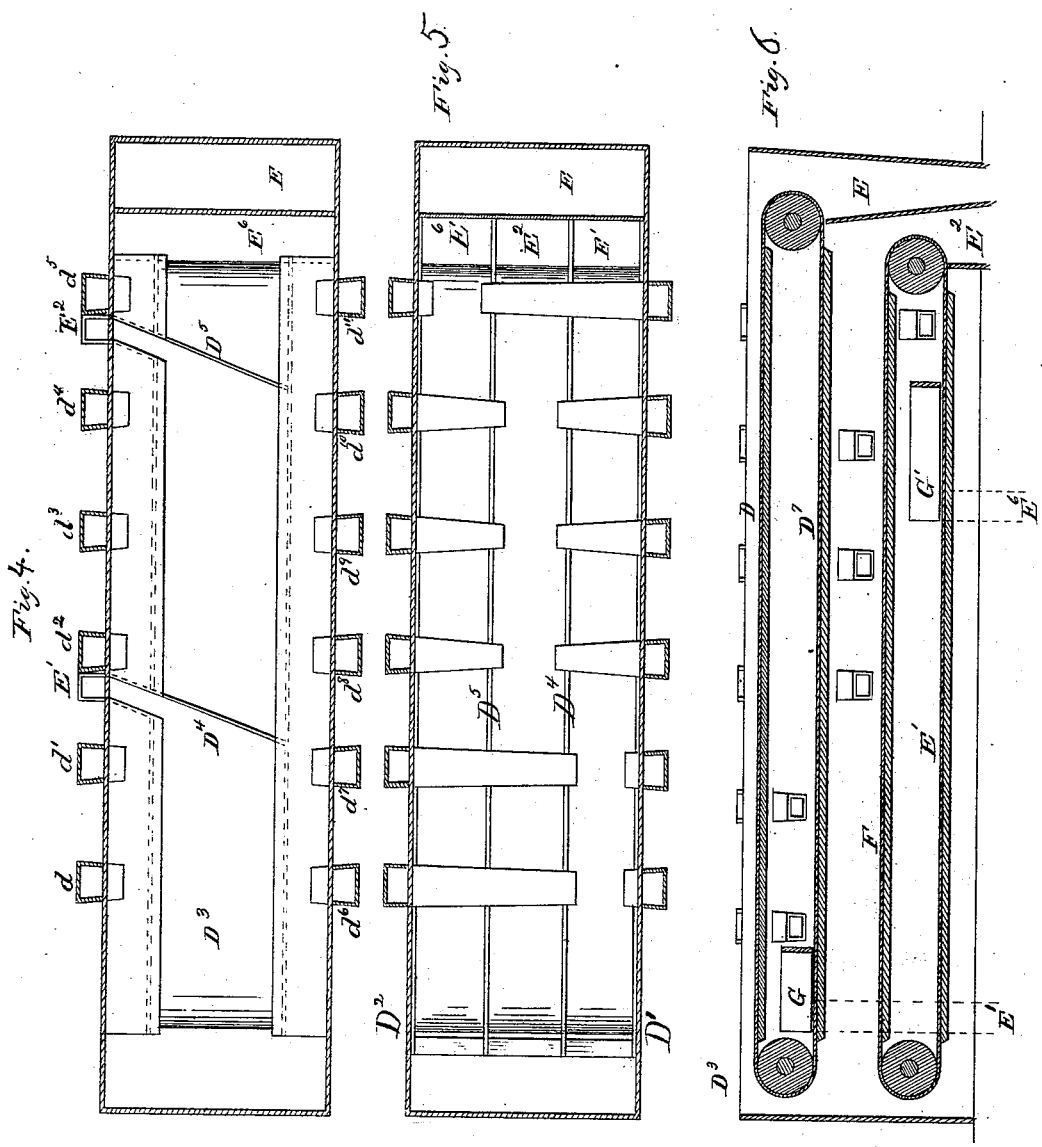

BENJAMIN F. WALTERS, OF NORFOLK, VIRGINIA.

CLEANING AND SEPARATING NUTS.

SPECIFICATION forming part of Letters Patent No. 228,703, dated June 8, 1880.

Application filed January 26, 1880.

*To all whom it may concern:*

Be it known that I, BENJAMIN F. WALTERS, of Norfolk, in the county of Norfolk and State of Virginia, have invented certain new and useful Improvements in Machines for Cleaning and Separating Nuts; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a view, partly in vertical section, partly in side elevation, of an apparatus embodying my improvement. Fig. 2 is a vertical transverse section on line $x\,x$, Fig. 1. Fig. 3 illustrates a modification of the carrier devices shown in Fig. 1. Fig. 4 is a view taken on the horizontal plane between the upper carrier and the lower carrier, showing a combination of devices with the lower carrier, to preserve a subdivision of materials placed thereon. Figs. 5 and 6 illustrate modifications of the devices for preserving subdivision of the material. Fig. 7 is a top-plan view of the devices for adjusting the tension of the apron.

The perfect nuts are first cleaned and also separated from the imperfect ones by the devices shown at A, B, and C, in a manner substantially similar to that shown and described in a patent heretofore granted to me on the 7th of October, 1879, No. 220,450, said devices for cleaning and separating consisting of a rotating screen or rumbler at A, a brushing and polishing machine, B, which receives the nuts after they leave the rotating cylinder, and a fan or blast separator, C, which operates to separate nuts having full kernels from those having partial kernels or no kernels, and also operating to remove what little dust or dirt may remain with the nuts after they leave the brushing-machine B.

The perfect nuts, after escaping from the discharge-mouth $c$ of the fan, are delivered upon an endless level carrier or picking-apron, D. This carrier is mounted upon suitable rollers, to which motion may be communicated in any desired manner. It is surrounded by a suitable casing having lateral walls $D'\ D^2$, the carrier being situated so that the upper part is a short distance below the upper edge of the casing, which extends a sufficient distance from the floor to permit a ready manipulation of the nuts as they are carried along by hand, standing on each side of the machine.

The nuts that are received from the fan upon the upper carrier are of various grades, which must be separated before they are placed upon the market, there being generally four or more grades.

The manner of separating that has been heretofore practiced is substantially as follows: Chutes or receptacles extending the full length of the carrier D have been employed to receive the three or more inferior grades that are moved from said carrier by the hands stationed by its sides, the best grade remaining being taken to the outer end of the carrier, and there delivered into a vertical chute similar to that shown at E. The three or more inferior grades that have been placed by the hands in the side chutes or receptacles have been conducted to a common discharge-spout below the apron, and it has been customary to produce a separation between these inferior grades by again lifting them to the top or upper part of the machinery and subjecting them to two or more similar operations.

This method I have found to be very inconvenient, from the fact that the nuts cannot be examined upon the picking-floor after they have been deposited in the side chutes, as they are carried immediately to the bags below, and it is thus impossible to strictly scrutinize the character of the material that is being picked from the apron. I have found it also expensive and disadvantageous on account of the repeated operations necessary, and have devised the following means for permitting an examination on the picking-floor of the material removed from the apron before it passes to the floor below, and means for producing and preserving a separation between nuts of four or more grades at one operation or one passage through the machinery.

The first of these objects I accomplish by using, instead of continuous side chutes or receptacles, small separated pockets, in which the nuts are placed after being removed from the apron and by combining with these separate pockets a second endless carrier, arranged to deliver the material placed upon it in such manner that it can be examined before passing to the floor below.

I attain the second end by combining the separated side pockets and the supplemental carrier devices arranged to preserve upon the carrier a separation between nuts of various grades that may be placed upon it.

When it is desired to remove from the upper apron but one grade of nuts a construction like that shown in Fig. 1 or in Fig. 3 accomplishes the purposes of my invention. The nuts that are removed from the upper apron are passed through the side pockets to a lower moving carrier, which delivers the nuts uniformly and slowly at a point upon the picking-floor where they are open to inspection by those upon said floor, and thus the passage of nuts of other grades than that desired can be detected.

The returning part $D^7$ of the upper carrier may be used to receive and convey the material taken from the upper part, D, to a spout, $E^7$, arranged to carry them to the floor below.

In order both to permit the above-described inspection on the picking-floor, and also to preserve a separation between the grades removed from the upper carrier, I combine with the carriers and with the separated side pockets partitions which provide different compartments, and which guide the nuts from the apron at different points.

Referring to Figs. 1 and 6, the separate side pockets on one side are represented by $d\ d'\ d^2\ d^3\ d^4\ d^5$, and the pockets respectively opposite the above by $d^6\ d^7\ d^8\ d^9\ d^{10}\ d^{11}$.

After the nuts leave the fan they are received in a common mass at the end $D^3$ of the carrier, and at or near this end the nuts of the lowest or darkest grade are removed by the hands at that part of the apron, and deposited, by preference, in the first four pockets, $d\ d'\ d^6\ d^7$, by which they are conveyed to the lower carrier.

$D^4$, Fig. 6, is a vertical partition, placed diagonally across the lower carrier in such position as to stop and guide to the edge the nuts of the lowest grade received from the last aforesaid pockets, and after reaching the edge they pass into a vertical spout, E'.

The nuts of the third grade are removed from the upper apron by the hands stationed near its center and deposited in the separate side pockets, $d^2\ d^3\ d^4\ d^8\ d^9\ d^{10}$. These intermediate nuts are received upon the lower carrier from the spout, and are carried by it until they strike against a guiding-board, $D^5$, whereby they are conducted to a vertical chute, $E^2$. The nuts of the remaining or second grade are removed by the hands nearest to the discharge end of the upper apron and deposited in the side pockets, $D^5\ D^{11}$, and when the construction in Fig. 6 is used they are delivered to a spout, $E^6$, at the end of the lower apron.

Instead of diagonally-arranged partitions or guides, longitudinal partitions, similar to those shown in Fig. 7 at $D^4$ and $D^5$, may be employed to preserve the separation that is rendered possible by the separate side pockets. With this construction the nuts of the lowest grade from the first four spouts are carried the full length of the lower carrier and delivered to an end spout, E'. The nuts of the intermediate grade are carried in a similar manner to another end spout, $E^2$, the remaining grade being carried to a third spout, $E^6$.

In Fig. 8 the separate side pockets and the two carriers are employed to preserve the subdivision in a slightly-modified manner, each part of each carrier being employed to convey one of the various grades.

The nuts of the lowest or darkest grade are delivered, by short inwardly-turned spouts, upon the lower part, $D^7$, of the upper carrier, by which they are taken back toward the feed end $D^3$ until they come in contact with an inclined board, G, which guides them to a vertical spout, E. Those of the intermediate grades are received upon the upper part, F, of the lower carrier, and by it are conveyed to a spout, $E^2$. The nuts of the third grade pass to the lower part, F', of the under carrier, and are taken backward until they come in contact with a diagonal board, G', which guides them to a separate vertical chute, $E^6$.

The side chutes, heretofore extending the full length of the apron, not only prevent subdivision at one operation, but remove the nuts from sight, so that they run into the bags on the floor below before inspection is possible.

By means of any of the constructions shown the nuts are delivered slowly at a point on the packing-floor where they can be examined at any time.

The casing in which the carriers are mounted is made detachable and removable from the fan, as shown in my previous patent, above mentioned.

It frequently becomes necessary to adjust the tension of the carrier-aprons, and also to remove them for repair and for permitting access to the interior of the casing.

I accomplish all of these objects by the following devices for mounting the rollers of the carriers: H H, Figs. 1 and 9, represent shifting bearers, in which the shaft or gudgeons of the carrier-roller are mounted. They are connected by a cross-piece, I, and may be supported in ways, as at $h$. K is a curvilinear slot in each of the bearings H, extending from the upper edge to a point forward of and below the opening. L L are screws supported by the casing and engaging with the cross-piece I. The roller shafts or gudgeons are mounted in the lower ends of the curved slots K K.

By means of the screws the carrier-apron can be tightened or loosened and the sliding bearings can be thrust sufficiently far forward to allow the rollers to be entirely removed from the open-ended slot when it is desired to remove the apron for any purpose. The aprons shown in any of the figures of the drawings can be mounted in this manner, as will be readily seen.

What I claim is—

1. In a machine for cleaning and separating nuts, the combination, substantially as herein set forth, of the following elements, viz., an upper endless carrier arranged to expose and convey the nuts on a substantially horizontal plane, the lower endless traveling carrier situated beneath said upper carrier and arranged above the floor on which the pickers stand, to convey material in a substantially horizontal direction, vertical chutes situated at the side of said carriers and arranged to receive the material that is removed by hand from the upper carrier and convey it to the lower carrier, and a discharge-chute which receives material from the lower carrier and which is open at its upper end to expose to view the material delivered thereto.

2. In a machine for separating nuts, the combination, substantially as herein set forth, of the following elements, viz, the upper endless carrier D, arranged to expose and convey the nuts on a substantially horizontal plane, whereby the nuts thereon may be separated by hand, an endless horizontal carrier arranged beneath said upper carrier, the partitions $D^4 D^5$ forming compartments above said lower carrier, separate discharge-chutes $E'$ $E^2$ $E^6$ receiving material from said compartments, respectively, and the side chutes, $d$ $d^3$ $d^5$, delivering, respectively, to said compartments, and arranged to receive the materials removed by hand from the upper carrier.

In testimony that I claim the foregoing I have hereunto set my hand.

BENJAMIN F. WALTERS.

Witnesses:
RICHD. WALKE,
WM. W. OLD.